United States Patent [19]

Greve

[11] Patent Number: 5,480,295

[45] Date of Patent: Jan. 2, 1996

US005480295A

[54] EASY-TO-LOAD EXTRUSTION SIZING DEVICE

[75] Inventor: Christopher G. Greve, Covington, La.

[73] Assignee: The Laitram Corporation, Harahan, La.

[21] Appl. No.: 298,040

[22] Filed: Aug. 30, 1994

[51] Int. Cl.⁶ ............................................. B29C 47/90
[52] U.S. Cl. ................. 425/71; 264/177.17; 264/178 R; 264/562; 425/70; 425/392
[58] Field of Search ..................... 425/71, 70, 377, 425/381, 380, 190, 190 R, 392; 264/178 R, 177.17, 177.16, 560, 562

[56] References Cited

U.S. PATENT DOCUMENTS

| | | | |
|---|---|---|---|
| 4,021,169 | 5/1977 | Heilmayr et al. | 425/71 |
| 4,090,828 | 5/1978 | Renegar | 425/71 |
| 4,401,424 | 8/1983 | De Zen | 425/388 |
| 5,139,402 | 8/1992 | Topf | 425/71 |

FOREIGN PATENT DOCUMENTS

| | | | |
|---|---|---|---|
| 2412818 | 9/1975 | Germany | 425/71 |
| 4033441 | 5/1991 | Germany | 425/71 |

Primary Examiner—Jay H. Woo
Assistant Examiner—Duane S. Smith
Attorney, Agent, or Firm—James T. Cronvich

[57] ABSTRACT

A sizing device having a series of sets of sizing dies each composed of first and second die elements for use in extruding articles. Each die element is made of a plate having two opposite faces bounded by a peripheral edge. The edge further defines a notch through the plate. The notch in each die element has an open end extending inwardly to a closed end. The first and second die elements can be moved relative to each other from an open position in which the notches are unoccluded to a closed position in which first and second die elements overlie each other in the direction of extrusion and abut with the notches partly occluded by the abutting complementary die element. When the die is closed, the interior closed ends of the notches of the abutting elements of each die overlap to form a passage through the die that determines the shape of the extrusion. Support structure maintains the series of die sets at spaced apart locations in a vacuum extrusion chamber. A pin through the second die elements allows them to pivot relative to the first die elements so that the entire die assembly can be opened together for easy loading and closed together during extrusion. A stop is positioned to register the complementary die elements when the die assembly is closed to form aligned passages through the series of ganged dies.

20 Claims, 2 Drawing Sheets

EASY-TO-LOAD EXTRUSTION SIZING DEVICE

BACKGROUND

The invention relates to the extrusion of articles and, more particularly, to a vacuum sizing device including a sizing die used to size and shape plastic extrusions pulled through the sizing die disposed in an evacuated chamber.

In the extrusion of plastic articles, such as cylindrical rods used as hinge rods in constructing modular plastic conveyor belts, it is common to size and shape the extruded rod with a series of sizing dies aligned along the length of a chamber. An extruder nozzle injects hot plastic into the chamber through an entrance opening at one end. The plastic is extruded through the entrance opening and the aligned dies and out of the chamber through a similarly sized exit opening. Typically, the chamber includes a liquid, such as water, that surrounds the extrusion and serves to cool the extrusion and lubricate the dies. The head of water and the pressure exerted on the extrusion can be adjusted by evacuating the top of the chamber.

For cylindrical rods, each sizing die has a closed circular opening aligned with the circular openings of the other of the series of dies. The dimensions of the openings are roughly the same as that of the desired cross-section of the extruded rod. The series of dies is typically mounted in a vacuum chamber, which causes the hot, moldable plastic to expand outwardly as it cools to take the shape of the die openings through which it is pulled.

One difficulty with extruding rods is getting the extrusion process started. Especially tedious is the job of threading the plastic through the series of closed circular die openings. One method is to backfeed a previously molded, thin, cold rod section through the exit opening of the chamber and through the die openings to the entrance opening. The soft, hot plastic exiting the extruder nozzle that adheres to the end of the cold rod is manually strung through the openings until it can be engaged by the puller. During this procedure, the extruder nozzle is adjusted to eject plastic at a low rate. Once the plastic is threaded through the chamber, the rate can be increased. Frequently, however, the bond between the end of the cold rod and the hot plastic breaks before the threading process is completed. The resulting mess must be cleaned up, and the process repeated until threading is complete.

To solve the threading problem, the dies of some vacuum sizing devices are split into halves that can be separated. In conjunction with a chamber that can be opened for access to the separated die halves, the hot plastic can be pulled from the opening and directed into the separated die halves through the separation. Once the plastic material extends through the series of dies, the die halves are closed, and the process can proceed. Although split sizing dies solve many of the threading difficulties, they introduce other problems.

Because split dies are split through the circular opening, unless the die halves mate exactly without offset and are fully flush, the exposed corners around the split are highly susceptible to wear. Another problem with split die halves is that a seam is extruded on one or both sides of the rod. In many applications, such a seam is unacceptable. For example, a seam on a pivot rod for a modular plastic conveyor belt, besides being cosmetically deficient, can interfere with good belt articulation, cause premature wear, and make the rod generally difficult to insert into position during belt construction.

Consequently, there is a need for an easy-to-load vacuum sizing device that can be used in the extrusion of seamless plastic rods.

SUMMARY

These needs are satisfied by the present invention. A sizing device having features of the invention includes an enclosure encompassing a chamber—for example, a vacuum chamber. Entrance and exit openings on opposite ends of the enclosure define an extrusion path along which an extrusion is pulled longitudinally through the chamber in a direction of extrusion. A sizing die assembly includes one or more sizing dies, each composed of a pair of complementary die elements. At least one of the die elements has a notched portion forming a notch extending from an open end inward to an interior closed end. Each of the die elements can be moved relative to the other between an open, separated position in which the one or more notches are unoccluded and a closed position in which the notches are partly occluded by an occluding portion of an abutting complementary die element and partly overlapped to form a passage through the die. With the die elements separated, the extrusion material can easily be threaded into one or the other of the unoccluded, open-ended notches in the aligned dies. Once the threading is complete, the die can be closed and the extrusion of production articles started. As the die is closed, the notches overlap such that their open ends are occluded by the abutting die element. The unoccluded, overlapping portions of the notches form a passage defining the size and shape of the extrusion.

A preferred version of the die assembly comprises a series of sets of sizing dies supported at spaced apart locations in the chamber along the extrusion path. The dies are aligned so that the series of passages formed with the die in the closed position are aligned along the extrusion path and determine the size and shape of the extrusion pulled through the dies.

The die elements preferably comprise plates having two opposite faces bounded by a peripheral edge. The edge defines a notch through the thickness of the plates. For the extrusion of circular rod, each notch is formed with a segmental cylindrical wall portion along the edge that forms a bounded circular passage with the notch of the complementary die element when the die is closed. Because the plates are offset longitudinally and abut along a plane normal to the extrusion pate no radial slots commensurate with the thickness of the dies are formed, as in split dies, through which extrusion material can migrate. Consequently, seamless extrusions can be formed.

In a preferred version of the die assembly, a first set of die elements is fixed at spaced apart locations along the extrusion path. A second set of die elements is ganged at spaced apart locations along a pivot axis parallel to the extrusion path and intersecting the first set of die elements. The second set can be pivoted, hinge-like, in the manner of a scissors from an open position for threading the extruder to a closed position for the extrusion process. A mechanical stop ensures that the first and second die elements are registered when in the closed position to form the correct size and shape of the series of extrusion passages. In this way, all of the aligned ganged dies can be opened and closed simultaneously for easy operation.

DRAWINGS

These and other features, aspects, and advantages of the invention are better understood by reference to the following description of one version thereof, the appended claims, and accompanying drawings in which:

DESCRIPTION

Figure 1:
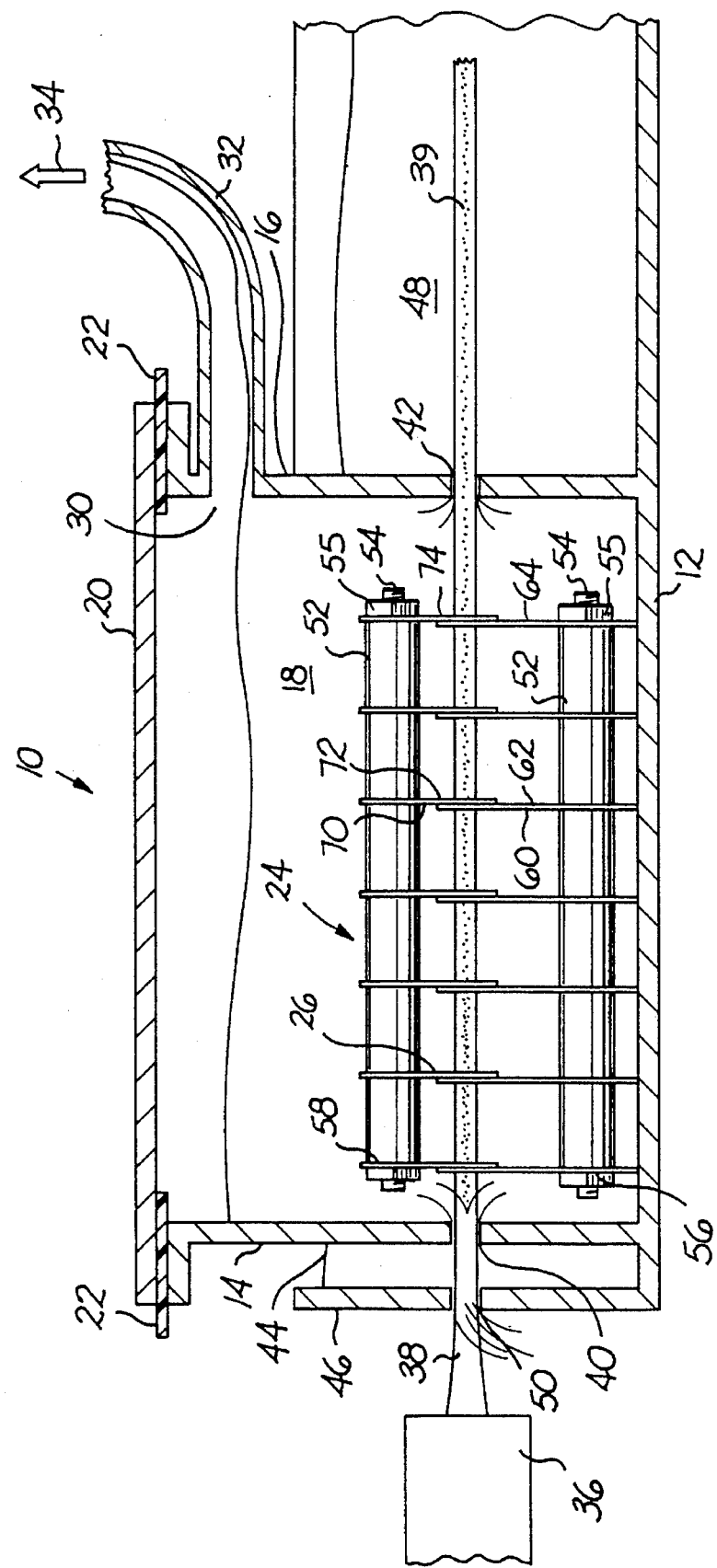
FIG. 1 is a cutaway partial side elevational view of a version of the extrusion device according to the invention.

A preferred version of the easy-to-load extrusion device according to the invention is shown in FIG. 1. An enclosure 10 having a bottom 12, an entrance end 14, an exit end 16, and side walls forms an interior chamber 18 covered by a lid 20 resting on seals 22. A sizing die assembly 24 includes a series of sets of sizing dies 26 spaced apart along the length of the chamber 18. The chamber 18 is flooded with a liquid 28, such as water, up to a level above the die assembly 24, but below the lid 20. A vacuum port 30 through an end 16 of the enclosure 10 is connected to a vacuum pump (not shown) through a vacuum line 32 to remove air from the enclosure 10 in the direction of arrow 34 to decrease the pressure in the chamber 18 and raise the water level.

An extruder nozzle 36 emits molten material 38, such as plastic, at an adjustable rate. The material is directed into the chamber 18 through the die assembly 24 via an entrance opening 40 in the entrance end 14 of the enclosure 10. The material 38 extruded through the die assembly 24 exits the chamber 18 through an exit opening 42 in the exit end 16 of the enclosure. The entrance and exit openings 40, 42 define an extrusion path through the die assembly 24 along which the extrusion 38 is pulled by a puller (not shown), such as a pair of frictional belts or rollers located downstream.

A pool 44 of replenishable water confined by a pool wall 46 supplies water to the chamber 18 through the entrance opening 40 of the enclosure 10. A downstream water-filled chamber 48 similarly supplies water through the exit opening 42 of the enclosure 10. The head of the water 28 in the chamber 18 is determined by the air pressure at the top of the chamber, which is controlled by the vacuum pump. In this way, the hydrostatic pressure acting on the extrusion 38 can be controlled. During operation of the vacuum chamber 18, the pressure at the top of the chamber is reduced below atmospheric so that a negative pressure is applied to the outside of the extruded material 38. A foaming agent in the material 38 forms bubbles 39 in the core of the extrusion that urge it to expand under the negative applied pressure to counteract the natural tendency of plastics to contract on cooling. In a properly adjusted vacuum chamber, the extruded material 38 is allowed to expand slightly to conform to the extrusion die. An opening 50 in the pool wall 46 directs the material 38 emitted by the nozzle 36 along the extrusion path.

Figure 2:
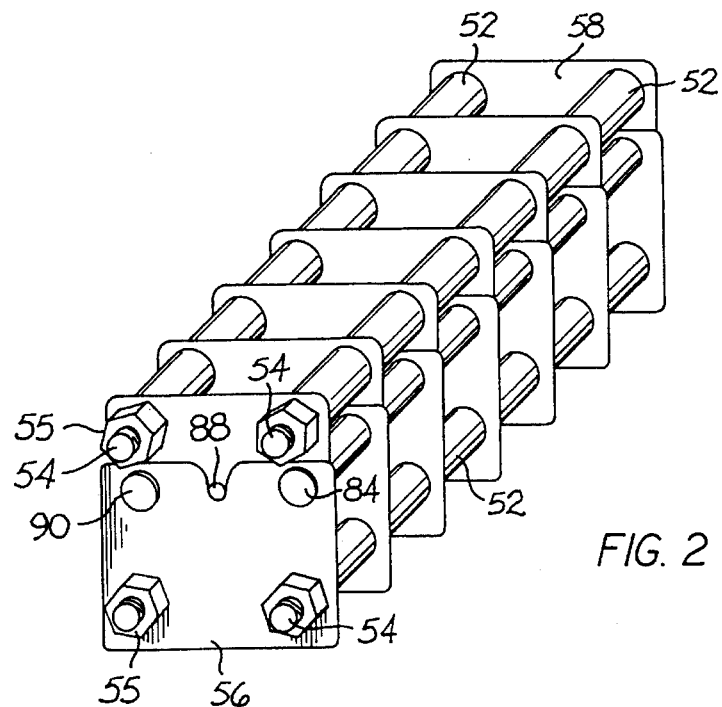
FIG. 2 is a perspective view of a version of the sizing die assembly of FIG. 1.
Figure 3A:
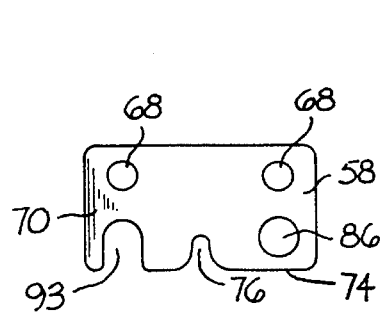
FIG. 3A is an end view of one of the die elements of FIG. 2.
Figure 3B:
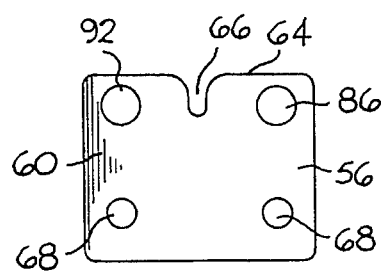
FIG. 3B is an end view of a die element complementary to the die element of FIG. 3A.

The die assembly 24 and its components are shown in more detail in FIGS. 2–4. In a preferred version, the die assembly 24 includes a series of dies 26 supported and spaced apart by, for example, hollow spacers 52 through which threaded rods 54 can be run and secured at the ends by nuts 55. Each die 26 includes two complementary elements in the form of notched plates 56, 58. The first plate 56 has a first face 60 and an opposing second face 62 joined by a peripheral edge 64 forming a notch 66. The first plate 56 also has a pair of holes 68 for the threaded rods 54. The second plate 58 has a first face 70 and an opposing second face 72 joined by a peripheral edge 74 forming a second notch 76. The second plate 58 also has holes 68 for the threaded rods 54. The notches 66, 76 shown have a semi-cylindrical mold portion 78 at the closed end of the notch and a straight loading portion 80 out to a rounded open end 82.

Figure 4A:
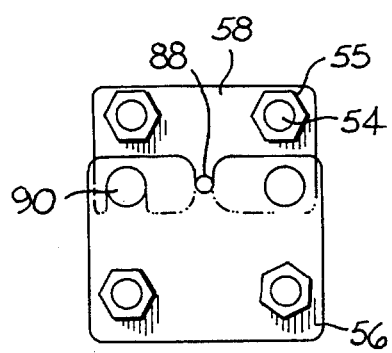
FIG. 4A is an end view of the sizing die assembly of FIG. 2 in a closed position.
Figure 4B:
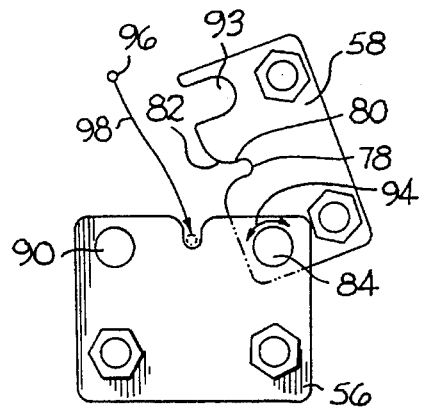
FIG. 4B is an end view of the sizing die assembly of FIG. 2 in an open position.

The first plate 56 and the second plate 58 of each die 26 are interconnected by a pivot pin 84 through holes 86 in each plate. Such an interconnection allows the two plates to scissor about the pivot pin 84 as indicated by two-headed arrow 94 from an open position as shown in FIG. 4B to a closed position as shown in FIG. 4A. In the closed position, portions of the first notch 66 and the second notch 76 overlap to form a passage 88 through the die 26 that constricts the extrusion 38 pulled through it, thereby determining its size and shape. A bar 90 parallel to the pivot pin 84 and the threaded support rods 54 resides in holes 92 through the gang of first die plates 56. A slot 93 in the second die plates 58 swings into engagement with the bar 92 when the die 26 is closed. The bar 92 keeps the first and second die plates 56, 58 in registration so that the passage 88 is accurately formed.

As shown in FIG. 1, the first plate 56 and the second plate 58 abut when the die 26 is closed with the second face 62 of the first plate abutting the first face 70 of the second plate. Because the first plate 56 is longitudinally offset from the second plate 58, the notches 66, 76 overlap longitudinally only, not transversely as in the case of split dies. This lack of transverse overlap eliminates seams from the extrusion.

With the die assembly 24 in the open position as shown in FIG. 4B, the notches 66, 76 are unoccluded by the complementary abutting die plate 58, 56 so that material 38 to be extruded can be loaded into one of the open-ended notches 66. When the die is closed as in FIG. 4A, the abutting plate occludes the open end portion 82 and the loading portion 80 of the notches, leaving only the mold portion 78 unoccluded to form the extrusion passage 88.

The spacers 52 and threaded rods 54, pivot pin 84, and the stop bar 90 all support the series of dies 26 at spaced apart locations with the extrusion passages 88 aligned along the extrusion path when the die is closed. Because the individual die sets 26 are ganged together along the support structure, the entire assembly 24 can be opened and closed together in the manner of a hinge to ease the threading process.

To thread the extrusion 38 through the die assembly 24, the nozzle 36 is first adjusted to emit material at a low rate. With the lid 20 removed from the top of the enclosure 10, the die assembly 24 is opened. A thin thread 96 of material is pulled from the nozzle 36 and into the chamber 18. The thread 96 is guided through the aligned unoccluded notches 66 in, for example, the lower first plates 56 and out the exit opening 42 of the enclosure 10 as indicated by arrow 98. Once the thread is loaded, the die assembly 24 is closed, the lid 20 replaced, the thread 96 led to the puller, the vacuum turned on, and the nozzle extrusion rate gradually increased to produce extruded rod of the desired diameter. Thus, the invention provides an easy-to-load sizing die assembly that can be used in a vacuum extrusion process to at least fulfill the needs and provide the specific features and advantages pointed out.

Although the invention has been described in detail with reference to a specific preferred version, other versions are possible. For example, the first and second die elements could be in forms other than flat plates and the elements need not be pivoted, scissor-like, into place. The complementary pairs could alternatively be separated completely in the open position and slid into the closed position, either as a gang or individually. The stop bar could be replaced by a stop not attached directly to the first stop plates, but, instead, to the inner side wall of the enclosure. Likewise, the stationary die plates could be directly affixed to the inside bottom of the enclosure, instead of using the lower spacers and threaded rod. The notches of each complementary plate need not be identical; one could form a greater portion of the mold passage than the other. Similarly, the notches could form shapes other than circular, depending on the desired cross-section of the extrusion. For example, to extrude a rod having a semicircular cross-section, one of the die plates need no notch at all. Consequently, as these examples indicate, the spirit and scope of the appended claims should not be limited to the description of the preferred version.

What is claimed is:

1. A sizing die assembly for an extruder, comprising:

a sizing die including a first die element forming a first notch therethrough and a second die element having a planar first face, the first die element having a planar second face; and positioning means for moving the first and second die elements between an open position with the first notch unoccluded and a closed position with the first and second die elements abutting and offset in the direction of extrusion with the planar first face of the second die abutting the planar second face of the first die along a plane substantially perpendicular to the direction of extrusion and with the first notch partly occluded by the second die element to form a passage through the sizing die in the closed position, the passage determining the size and shape of an extrusion pulled through the die assembly.

2. The sizing die assembly of claim 1 wherein the positioning means comprises a hinged interconnection between the first die element and the second die element.

3. The sizing die assembly of claim 1 wherein the second die element forms a second notch therethrough and wherein the positioning means moves the first and second die elements between an open position with the first and second notches unoccluded and a closed position with the first and second die elements abutting and offset in the direction of extrusion with the first and second notches partly occluded by the second die element and the first die element, respectively, and overlapping to form a passage through the sizing die.

4. The sizing die assembly of claim 3 wherein the first notch and the second notch have substantially the same shape.

5. The sizing die assembly of claim 3 wherein the first notch and the second notch define a circular passage with the die in the closed position.

6. The sizing die assembly of claim 1 wherein the first die element comprises a first plate having a first face opposite the planar second face, the faces bounded by a peripheral edge, the peripheral edge of the first plate defining the first notch, and wherein the second die element comprises a second plate having a second face opposite the planar first face, the faces bounded by a peripheral edge, peripheral edge of the second plate defining a second notch, the positioning means maintaining a portion of the first face of the second plate proximate the second notch in abutment with a portion of the second face of the first plate proximate the first notch whenever the die is in the closed position.

7. The sizing die assembly of claim 6 wherein the peripheral edge of the first plate forms a portion of the first notch with a segmental cylindrical wall along the edge of the first plate and wherein the peripheral edge of the second plate forms a portion of the second notch with a segmental cylindrical wall along the edge of the second plate.

8. The sizing die assembly of claim 6 wherein the peripheral edges of the first and the second plates each comprise a semicylindrical wall portion forming part of the notch and defining a circular extrusion passage whenever the die is in the closed position.

9. The sizing die assembly of claim 6 wherein the peripheral edges of the first and the second plates each comprise a wall portion forming part of the notch and defining a bounded extrusion passage whenever the die is in the closed position.

10. The sizing die assembly of claim 1 further comprising a series of sets of sizing dies supported at spaced apart locations along the extrusion path.

11. The sizing die assembly of claim 10 wherein the positioning means simultaneously moves the sets of sizing dies between the open position and the closed position.

12. The sizing die assembly of claim 10 further comprising support means for supporting the sets of sizing dies at spaced apart locations along the direction of extrusion and aligning the sets of sizing dies in the closed position with the series of passages in alignment along the direction of extrusion.

13. The sizing die assembly of claim 10 further comprising a stop engaging at least one of the first and second die elements in the closed position.

14. The sizing die assembly of claim 10 wherein the first die elements are stationary and the second die elements pivot.

15. A sizing die assembly for an extruder, comprising a series of sets of sizing dies disposed at spaced apart locations along an extrusion path, each of the sets including a first die element having a first notch and a second die element having a second notch, the first die element comprising a plate having a planar rearward face and the second die element comprising a plate having a planar forward face, the first die element pivotally attached to the second die element to allow the die elements to scissor from an open position with the first notch unoccluded by the second die element to a closed position with the rearward face of the first die element abutting the forward face of the second die element along a plane substantially perpendicular to the extrusion path and with the first notch partly occluded by the second die element to form a passage through the sizing die determining the size and shape of an extrusion pulled therethrough along the extrusion path.

16. The sizing die assembly of claim 15 further comprising a stop engaging at least one of the first and second die elements in the closed position.

17. The sizing die assembly of claim 15 wherein the first die elements are stationary and the second die elements pivot.

18. The sizing die assembly of claim 17 wherein the second die element has a second notch and wherein the second notch is unoccluded by the first die element in the open position and wherein the first and second notches overlap and the second notch is partly occluded by the first die element in the closed position.

19. The sizing die of claim 18 wherein the first and second die elements each form notches with segmental cylindrical portions to form a circular passage through the sizing die in the closed position.

20. A sizing device used in an extruder, comprising:

an enclosure encompassing a chamber and having an extrusion entrance opening and an extrusion exit opening through opposite ends of the enclosure, the openings defining an extrusion path extending longitudinally therebetween through the chamber along which an extrusion is pulled;

a series of sets of sizing dies, each of the sets of sizing dies including a first die element and a second die element, the first die element forming a first notch therethrough and the second die element forming a second notch therethrough, the first die element comprising a plate having a planar rearward face and the second die element comprising a plate having a planar forward face;

support means for supporting the sets of sizing dies at longitudinally spaced apart locations along the extrusion path within the enclosure; and positioning means for moving the first and second die elements from an open position with the notched unoccluded to a closed position with the first and second die elements offset longitudinally along the extrusion path and in abutting relationship with the rearward face of the first die element contacting the forward face of the second die element along a plane substantially perpendicular to the extrusion path and the first and second notches partly occluded and overlapping to form a passage therethrough along the extrusion path, the support means further aligning the sets of sizing dies with the series of passages in longitudinal alignment, the sizing dies determining the size and shape of an extrusion pulled through the aligned passages in the chamber.

* * * * *